United States Patent [19]

Bolitho

[11] Patent Number: 4,828,452
[45] Date of Patent: May 9, 1989

[54] SINGLE ENGINE EXCAVATOR CAPABLE OF RAILROAD USE

[75] Inventor: Jack A. Bolitho, Uhrichsville, Ohio

[73] Assignee: The Gradall Company, New Philadelphia, Ohio

[21] Appl. No.: 98,103

[22] Filed: Sep. 17, 1987

[51] Int. Cl.[4] .............................................. B60K 41/02
[52] U.S. Cl. ................................... 414/718; 105/72.2; 105/215.2; 180/53.2; 180/321
[58] Field of Search ........................... 105/72.2, 215.2; 180/53.2, 53.4, 321, 324, 335, 53.8; 414/687, 690, 718, 728; 123/319, 395, 401; 60/420, 421, 427

[56] References Cited

U.S. PATENT DOCUMENTS

| | | |
|---|---|---|
| 2,345,224 | 5/1941 | Upp . |
| 2,638,232 | 5/1953 | Perkins . |
| 2,708,800 | 5/1955 | Logus . |
| 2,761,569 | 9/1956 | Iserman . |
| 2,783,556 | 3/1957 | Burns et al. . |
| 2,796,997 | 6/1957 | Iserman . |
| 2,817,911 | 12/1957 | Owen et al. . |
| 2,959,260 | 11/1960 | Johnson et al. . |
| 2,981,012 | 4/1961 | Meyer . |
| 3,059,716 | 10/1962 | Iserman et al. . |
| 3,212,356 | 10/1965 | Davis . |
| 3,524,029 | 1/1969 | Horsch et al. . |
| 3,599,814 | 8/1971 | Brownfield .................... 180/53.2 X |
| 3,779,608 | 12/1973 | Hatcher et al. ................ 180/53.2 X |
| 3,854,160 | 12/1974 | Hildebrand et al. . |
| 4,015,482 | 4/1977 | Ito et al. . |
| 4,023,364 | 5/1977 | Bianchetta . |
| 4,162,714 | 7/1979 | Correll ............................ 180/53.4 |
| 4,189,021 | 2/1980 | Scheuerpflug et al. ........ 180/53.2 X |
| 4,214,665 | 7/1980 | Newman ........................ 105/72.2 X |
| 4,318,451 | 3/1982 | Liggett . |
| 4,516,655 | 5/1985 | Donahue et al. ............... 180/321 |
| 4,534,297 | 8/1985 | Johnson, Sr. ................... 105/215.2 |
| 4,705,450 | 11/1987 | Gano . |

FOREIGN PATENT DOCUMENTS

| | | | |
|---|---|---|---|
| 2915964 | 11/1980 | Fed. Rep. of Germany ..... | 180/53.2 |
| 2139164 | 11/1984 | United Kingdom ............... | 180/53.2 |

*Primary Examiner*—Leslie J. Paperner
*Attorney, Agent, or Firm*—Kirkpatrick & Lockhart

[57] ABSTRACT

A material handling vehicle is provided which is capable of operation on the highway, off-road and on railroad tracks. The vehicle includes a lower truck chassis having an engine and a first operator's cab and an upper structure which includes an upper structure operator's cab and a material handling implement. In the travel mode of operation, the engine is directly connected to the torque converter of a powershift transmission to provide a rotational output to the drive wheels. In the off-road or remote operating mode of the excavator, the transmission is controlled so as to prohibit the connection between the torque converter and the transmission gears. However, a power take-off on the transmission is coupled to a hydraulic pump which provides hydraulic fluid under pressure to a hydraulic motor which, in turn, may provide rotational power to a secondary input to the transmission to provide drive power. In the railroad operating mode of the present invention, the engine is coupled by means of the torque converter to the transmission to provide driving power. In addition, the engine is coupled to the hydraulic pump to provide hydraulic fluid under pressure to power the excavator functions. The upper structure cab includes two throttle controls for controlling engine speed while operating in the remote operating mode.

18 Claims, 5 Drawing Sheets

SINGLE ENGINE EXCAVATOR CAPABLE OF RAILROAD USE

BACKGROUND OF THE INVENTION

1. Field of the Invention

This invention relates to material handling vehicles and, more particularly, to a material handling vehicle for use in highway, off-road and railroad applications which includes a single engine that may be controlled from multiple operator's stations.

2. Description of the Prior Art

Heretofore, material handling vehicles such as excavators or cranes have been developed for use on highways and on railroad tracks. Such vehicles typically include a lower or truck chassis on which there is pivotally mounted an upper structure that supports a material handling implement. The lower chassis is capable of being driven over the road or highway under the control of an operator in a cab mounted on the lower chassis. The lower chassis additionally includes deployable railroad wheels to guide the vehicle's movement along railroad tracks with driving power being provided by the engagement of the drive wheels of the lower chassis with the railroad tracks. An upper structure is mounted on the lower chassis by a swing bearing through which a center pin extends for relative movement with respect to the lower chassis. An upper structure operator's cab is provided on the upper structure as well as a material handling boom and implement. During operation on railroad tracks, an operator in the upper structure operator's cab can control movement of the lower chassis and also of the material handling implement.

Previously, in order to provide power for remote operation under the control of an operator in the upper structure cab of both the manipulations of the material handling implement as well as the movement of the vehicle along the railroad tracks, two separate engines were required. One engine was mounted on the lower chassis and controlled the highway operation of the vehicle. A separate engine was mounted on the upper structure and provided power to the material handling mechanism as well as powering, through a hydraulic pump and motor, the motion of the lower chassis.

As is well known in the art, the previously unavoidable requirement of two separate engines, one on the truck chassis and one on the upper structure, was fraught with a host of disadvantages. For example, in the prior art construction requiring two separate engines, the additional weight and cost of the auxiliary engine itself as well as duplicate fuel tanks, radiators, batteries and charging systems, air compressors and dryers, power steering pumps, air cleaners and exhaust systems, controls, shroudings and mountings, noise barriers, engine gauges, etc. are incurred. In addition, duplicate maintenance functions are involved in a two-engine vehicle and operating costs are necessarily increased. Further, the inclusion of the second engine and hydraulic reservoir on the movable upper structure raised the center of gravity of such material handling vehicles. Such a high center of gravity imposed engineering and operating restrictions which were considerable.

It is apparent that for a material handling vehicle to be effective for railroad applications, it must have the capability of pulling railroad cars along the tracks. For example, in the case of an excavating vehicle, the apparatus should have the capability of pulling a hopper car along the tracks which may be filled with material removed by the excavator. Prior art two-engine excavating vehicles provided alternative means for powering the vehicle's movement along railroad tracks. In one operating mode, an operator in the lower operator's cab could drive the lower chassis while pulling a railroad car. While this mode of operation provided sufficient power to allow the vehicle to pull a railroad car, an operator who was in the upper cab would have to move to the lower cab to control vehicle travel on the railroad tracks. If excavating was to be performed during travel on railroad tracks, because all excavator functions were controlled from the upper structure operator's cab, a second operator in the upper structure cab was required to manipulate the material handling implement under the power of the upper structure engine. As such, in that operating mode, both engines were running and two operators were required. If only a single operator were present in the upper structure operator's cab, and the upper structure engine was actuated to provide power to a hydraulic pump to power the material handling implement functions as well as power the vehicle by a hydraulic motor, the power required to move a railroad car would not be available. Accordingly, prior art two-engine excavators have proven unsuitable for use in railroad applications.

The assignee of the present invention has developed an alternative method of powering a material handling vehicle for use in highway and off-road, but primarily not railroad, applications. This apparatus, disclosed in U.S. patent application Ser. No. 807,616, filed Dec. 11, 1985, now U.S. Pat. No. 4,705,450, relates to a material handling vehicle having a lower chassis which includes an engine and a first operator's cab. An upper structure is pivotally mounted on the lower chassis and includes an upper structure operator's cab and a material handling implement. Such a vehicle may be powered in one of two ways. First, an operator in the lower cab may control the engine so as to drive through a powershift transmission to power the drive wheels of the vehicle. If operation is intended from the upper structure operator's cab, by the proper control of the powershift transmission, the engine is effectively disconnected from the transmission and, instead, drives a hydraulic pump. The hydraulic pump may power the excavator functions and supply hydraulic fluid under pressure to a hydraulic motor. The hydraulic motor may then be caused to drive a secondary input into the powershift transmission to cause it to generate a rotational output effective to drive the vehicle's drive wheels.

However, such a vehicle also suffers shortcomings when considered for use in railroad applications. Only two modes of operating and powering such a vehicle would be possible in a railroad application. In one operating mode, an operator in the lower truck cab could drive the vehicle with the engine directly coupled to the transmission to power the vehicle. In this mode, sufficient power would be available to tow a railroad car. However, no excavator functions would be possible. In an alternative operating mode, an operator in the upper cab could control the movement of the vehicle under driving power provided by the engine through the hydraulic pump and motor into the transmission. However, because of the limited capacity of the hydraulic motor, the vehicle would not possess sufficient power to pull a railroad car. Accordingly, while the single engine material handling vehicle eliminates certain of the problems associated with two-engine excavators, such a vehicle is unsuitable for complete railroad operation.

The subject invention is directed toward an improved material handling apparatus which overcomes, among others, the above discussed problems with material handling vehicles intended for use on railroad tracks and which is effective to sufficiently power the vehicle to allow control by one operator of a vehicle having sufficient power to tow a railroad vehicle and control the material handling implement functions.

SUMMARY OF THE INVENTION

In accordance with the present invention, there is provided a material handling vehicle which is capable of movement on highways, off the road and on railroad tracks. The vehicle includes a lower chassis having an engine mounted thereon and a lower chassis operator's cab. The lower chassis horizontally pivotally supports an upper structure which includes an upper structure operator's cab and a material handling implement. As such, unlike prior art two engine material handling vehicles, the present apparatus requires only a single lower chassis mounted engine for powering movement of the vehicle on the road, off the road and on railroad tracks under the control of a single operator.

When the vehicle is intended for on-road operation, an operator in the lower chassis operator's cab may control the operation of the engine to drive through a powershift transmission which, in turn, provides a rotational output sufficient to power the drive wheels of the vehicle. In the off-the-road or "remote" operating mode of the subject vehicle, an operator in the upper structure operator's cab may control vehicle movement. In that operating mode, the solenoids of the powershift transmission are operated so as to allow the engine to turn the torque converter of the powershift transmission while disengaging sufficient clutches thereof to cause the torque converter not to be coupled to the various gears of the transmission. The rotational output of the engine is supplied to the gears within the torque converter housing which drive, by means of a secondary output, a hydraulic pump by means of a first air cylinder actuated jaw clutch. The hydraulic pump provides pressured hydraulic fluid to control the material handling implement functions and to drive a hydraulic motor. The hydraulic motor is coupled by means of a second air cylinder actuated jaw clutch to a secondary rotational input to the transmission. The rotational power input to the transmission by the hydraulic motor may then power the movement of the vehicle under the control of an operator in the upper operator's cab.

In accordance with the third operating mode of the present invention, an operator situated in the upper operator's cab may control the movement of the vehicle on railroad tracks. Due to the drive mechanism described below, the single engine apparatus possesses sufficient drive power to pull a railroad car. In the third or "railroad" operating mode, the engine drives the torque converter which is coupled to the gears of the powershift transmission. In addition, the first air cylinder is actuated so as to cause the jaw clutch to couple the hydraulic pump with the torque converter. Accordingly, the engine provides driving power through the transmission and also powers the hydraulic pump so as to provide pressurized hydraulic fluid for powering the material handling implement functions.

In order to control the vehicle from the upper structure operator's cab in the railroad operating mode, additional controls are provided in the upper structure operator's cab. In particular, an upper structure transmission controller is coupled to the primary transmission control box used to control the transmission clutch solenoids and, hence, gear range. In addition, the engine speed may be controlled from the upper structure operator's cab by means of two different throttle control mechanisms whose use is selected depending on the desired vehicle capabilities. The throttle controls available are either a friction detented hand throttle control or a spring return throttle control. If the friction detented actuator is selected, the upper transmission controller remains disabled and the transmission will remain in neutral. The friction detented throttle control is employed when the vehicle is in the remote operating mode, as well as the railroad operating mode, and the operator desires to manipulate the material handling implement. By virtue of the friction detented throttle control, the engine speed may be increased to a sufficient level to allow maximum power to be provided to the material handling implement. Alternatively, if the spring return throttle is selected, the upper structure transmission controller is enabled thereby making transmission gear selection possible. The spring return throttle is employed when the operator desires to move the vehicle along the railroad tracks. As such, the engine speed may be infinitely varied to provide the desired power for movement.

Accordingly, the present invention provides solutions to the aforementioned problems relating to material handling vehicles intended for use in railroad applications. As the single engine arrangement disclosed herein is effective to provide the required vehicle movement and implement control power, the disadvantages of two-engine machines are avoided. Further, by virtue of the unique aspects of the railroad operating mode, the single engine vehicle possesses sufficient drive power to tow a railroad car.

These and other details, objects and advantages of the invention will become apparent as the following description of the present preferred embodiment thereof proceeds.

BRIEF DESCRIPTION OF THE DRAWINGS

In the accompanying drawings, there is shown a present preferred embodiment of the invention wherein.

DETAILED DESCRIPTION OF THE PREFERRED EMBODIMENT

Referring now to the drawings wherein the showings are for purposes of illustrating the present preferred embodiment of the invention only and not for purposes of limiting same, the figures show a mobile material handling vehicle 10, which for purposes of the present Detailed Description of the Preferred Embodiments, will be described as an extensible or telescoping boom hydraulic excavating apparatus, also called an excavator. It is to be understood that various other forms of material handling apparatuses are also contemplated as being within the scope of the present invention.

Figure 1:
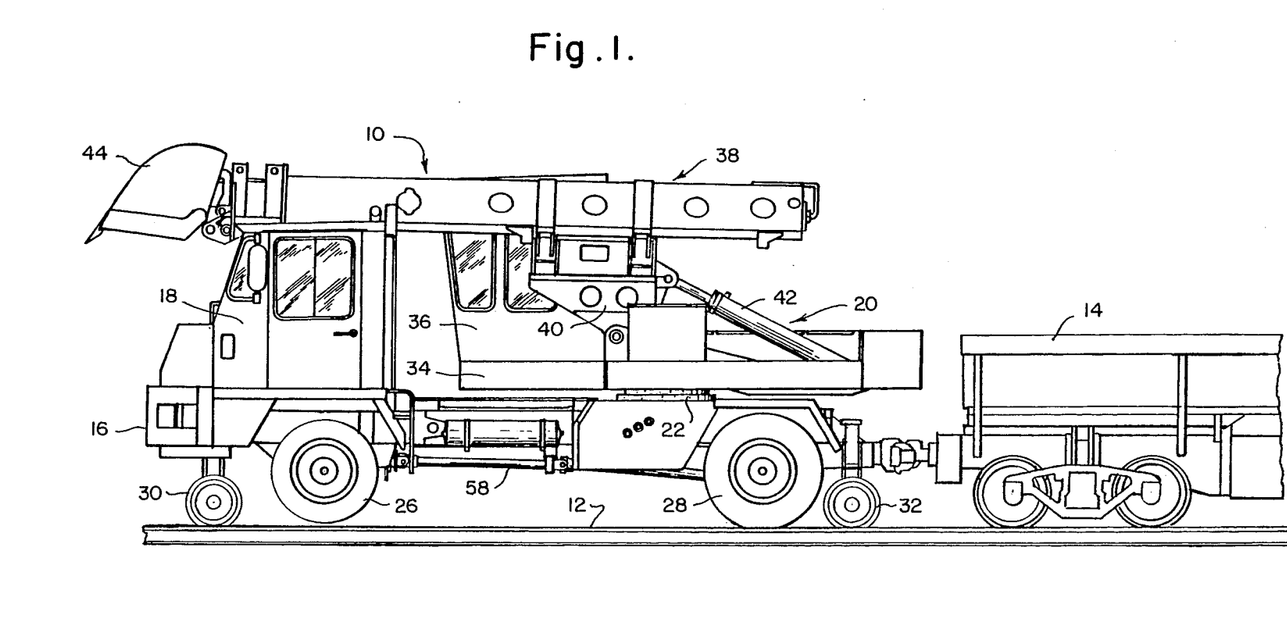
FIG. 1 is a side elevational view of the material handling apparatus disclosed herein.

More particularly, and with reference to FIG. 1, there is shown a mobile material handling vehicle 10 which is capable of operating on railroad tracks 12 and of pulling a railroad car 14. The excavator 10 includes a lower truck chassis 16 which includes a lower operator's cab 18. The lower chassis 16 supports an upper structure, generally designated as 20, by means of a swing bearing 22 through which a center pin 24 passes such that the upper structure 20 is rotatable with respect to the lower chassis 16 by means of a hydraulic swing motor (not shown). The lower chassis is provided with front wheels 26 and rear wheel 28, which rear wheels 28 normally serve to drive the excavator 10. When the excavator 10 is employed on railroad tracks 12, a front railroad wheel assembly 30 and a rear railroad wheel assembly 32 are moved from a retracted position on lower chassis 16 to an extended position to engage the railroad tracks 12. In a preferred embodiment of the invention, when the front and rear railroad wheel assemblies 30 and 32, respectively, are moved, the front wheels 26 of the excavator 10 will be elevated while the rear wheels 28 will be in engagement with the railroad tracks 12.

The upper structure 20 includes a platform, generally indicated as 34, on one end of which is mounted an upper structure operator's cab 36. In addition, an extensible boom means, generally 38, is mounted to a boom support cradle 40 which construction allows boom 38 to be vertically pivotally movable with respect to upper platform 34 by a hydraulic cylinder 42. The boom 38 is preferably mounted on cradle 40 so as to be pivotable by a hydraulic cylinder (not shown) about an axis parallel to the longitudinal axis of boom 38. In addition, boom 38 is hydraulically extendible by means known to those skilled in the art. An excavating bucket 44 is pivotally attached to the free end of boom 38 so as to be pivotable with respect thereto by hydraulic means known to those skilled in the art.

The excavator 10 disclosed herein is capable of three operating modes. In the first operating mode, referred to herein as the "travel mode", an operator in the lower cab 18 may control the movement of the excavator 10 along a highway. In a second operating mode of the excavator 10, referred to herein as the "remote operating mode", an operator in the upper structure cab 36 may control movement of the excavator 10 on or off the road. In a third operating mode of the excavator 10, referred to herein as the "railroad mode", an operator in the upper structure cab 36 may control movement of the excavator 10 along railroad tracks 12. In FIGS. 2-5, the components of excavator 10 disposed on lower chassis 16 are shown as being connected above center pin 24 while, for purposes of illustration, the components shown below center pin 24 are disposed on the upper structure 20.

An engine 46 mounted on the truck chassis 16 provides power for driving the excavator 10 on the road, off the road and on railroad tracks 12. In addition, by means described hereinbelow, engine 46 provides power for controlling the manipulation of the hydraulic functions associated with the upper structure 20 and the boom 38. The engine 46 may comprise a suitable source of power for excavator 10 such as a Cummins engine Model 6BT5.9 turbocharged diesel liquid cooled four-cycle in-line six cylinder engine. The engine 46 has a throttle regulating means 45, such as an injection pump, which controls the speed of engine 46. A transmission 48 having a torque converter 50 is disposed adjacent to engine 46. An input, shown schematically as item 47, to torque converter 50 is powered by engine 46. Torque converter 50 provides two rotational outputs. One output drives through the torque converter to a first power input, shown schematically as 49, to the gears of transmission 48, shown generally as 51. The other output provides a mechanical power take-off 52 disposed within the housing of torque converter 50 to provide power mechanically around torque converter 50. Transmission 48 will preferably comprise a powershift transmission such as that manufactured by Funk, Inc. as Model 2000 which is a six-speed full powershift transmission with six speeds forward, three reverse and neutral. Forward motion, reverse motion and the gear range employed may be selected through the use of electrically controlled solenoids generally designated as 54, which control hydraulically actuated multiple disc clutches mounted within transmission 48. The clutches are preferably hydraulically applied and spring released. Transmission 48 preferably has a rear facing power output 56 coupled to gears 51, which power output 56 by means of a drive shaft 58, can drive a rear axle (not shown) and, hence, the rear wheels 28. Transmission 48 also has a secondary power input means 57 which may also drive the gears of the transmission 48.

The actuation of transmission solenoids 54 to control the direction of movement and gear range of transmission 48 is controlled by a transmission control box 60 mounted in the lower cab 18. Transmission control box 60 includes the control logic circuitry necessary to control the solenoids 54 to effectuate the transmission 48 operations described herein. In order to provide a source of pressurized hydraulic fluid for powering the hydraulic functions of upper structure 20 and boom 38 and for powering the vehicle 10 in its remote operating mode, there is provided a jaw clutch 62 which may be operatively connected to the power take-off 52 of torque converter 50. The rotational output of jaw clutch 62 is input into a hydraulic pump 64. Hydraulic pump 64 preferably comprises a two-section unit. A first pump section of hydraulic pump 64 provides hydraulic driving fluid to a travel control valve, not shown, which controls the provision of pressurized hydraulic fluid from hydraulic pump 64 to a hydraulic motor 66. Hydraulic motor 66 may be coupled by means of a second jaw clutch 68 to a secondary rotational input means, shown schematicaly as 57, to transmission 48. The second pump section of hydraulic pump 64 provides hydraulic fluid under pressure for powering the swing motor for moving upper structure 20 relative to lower chassis 16, the actuation of hydraulic cylinder 42, the hydraulic means for pivoting boom 38 about its axis, the hydraulic means for extending and retracting boom 38 and the hydraulic means for pivoting bucket 44 relative to boom 38 by means known to those skilled in the art.

The actuation of jaw clutches 62 and 68, the control of transmission 48 and of the throttle to engine 46 in the various operating modes of excavator 10 will now be discussed. A travel/remote selector switch 70 is mounted in lower cab 18 and has an input voltage imposed thereon by a source 72. Travel/remote selector switch 70 is movable between a first position for employment of the vehicle 10 in its travel mode and a second position for use of the vehicle 10 in either the remote or railroad operating modes. A railroad/remote selector switch 74, which is also imposed with an input voltage from source 72, is provided in the lower cab 18 and is displaceable between a first position in which the railroad operating mode is selected and a second operating position for engagement of the remote operating mode.

Travel/remote selector switch 70 is electrically connected to a double-acting first electric solenoid valve 76. Supply air under pressure is provided from a source, generally indicated as 78, to first air solenoid valve 76. A single-acting second electric solenoid air valve 80 is electrically connected to railroad/remote switch 74 and is in pneumatic flow communication with air solenoid valve 76. The pneumatic output of air solenoid valve 76 may also be selectively supplied to a first air cylinder 82. First air cylinder 82 is connected by means of a linkage 83 to the first jaw clutch 62 to control the engagement of hydraulic pump 64 with the power take-off 52 from torque converter 50. As such, when pneumatic pressure is applied to the rod end of first air cylinder 82, the first jaw clutch 82 is engaged while, if pneumatic pressure is applied to the barrel end of first air cylinder 82, the first jaw clutch 82 is disengaged. In addition, the pneumatic output of first air solenoid valve 76 may be supplied through second air solenoid valve 80 to a second air cylinder 84. Second air cylinder 84 is connected by means of a linkage 85 to second jaw clutch 68 so as to control the coupling of hydraulic motor 66 with the secondary rotational input 57 to transmission 48. When pneumatic pressure is applied to the rod end of second air cylinder 84, the jaw clutch 68 is disengaged while, when pneumatic pressure is applied to the barrel of second air cylinder 84, the jaw clutch 68 is engaged.

Figure 2:
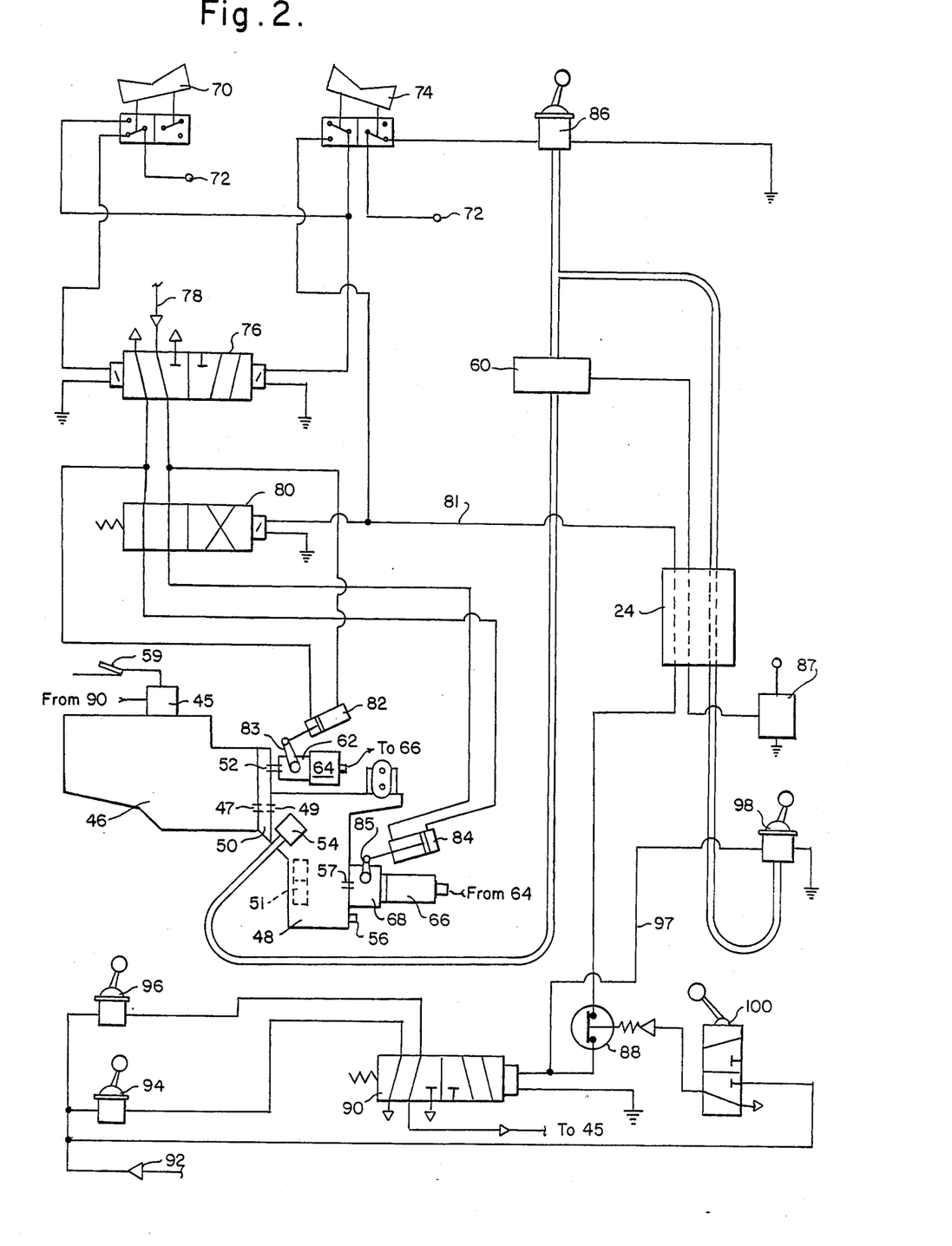
FIG. 2 is a schematic view of the components of the material handling apparatus in its travel operating mode.

When the travel/remote selector switch 70 is in its first position thereby selecting the travel mode, the first solenoid air valve 76 is in its first position. As no electrical power is supplied to railroad/remote switch 74, second air solenoid 80 is in its first position. In the first position of air solenoid valve 76, pneumatic pressure is provided from source 78 to the barrel side of first air cylinder 82 to cause jaw clutch 62 to be disengaged from power take-off 52 thereby disconnecting hydraulic pump 64 from first power take-off 52. In addition, in the first positions of first and second air solenoid valves 76 and 80, respectively, pneumatic pressure is supplied from source 78 through first air solenoid valve 76 to second air solenoid valve 80 to pass to the rod side of second air cylinder 84 to disengage the second jaw clutch 68 from the secondary input 57 to transmission 48 thereby disconnecting the hydraulic motor 66 from transmission 48.

When in the travel mode, a transmission selector switch 86 mounted in the lower cab 18 is activated (as described below) to provide an input to transmission control box 60 which, in turn, controls the solenoids 54 of transmission 48 to control its gear range. In the lower cab 18, there are also provided customary steering and braking controls as well as a throttle control 59 coupled to the throttle regulating means 45 of engine 46. As such, when in the travel mode, the hydraulic pump 64 and hydraulic motor 66 are not connected to the torque converter 52 and secondary power input 57 to transmission 48, respectively, and an operator in the lower cab 18 may drive the excavator 10 controlling the engine 46 by means of throttle controller 59 which is coupled to throttle regulating means 45.

Figure 3:
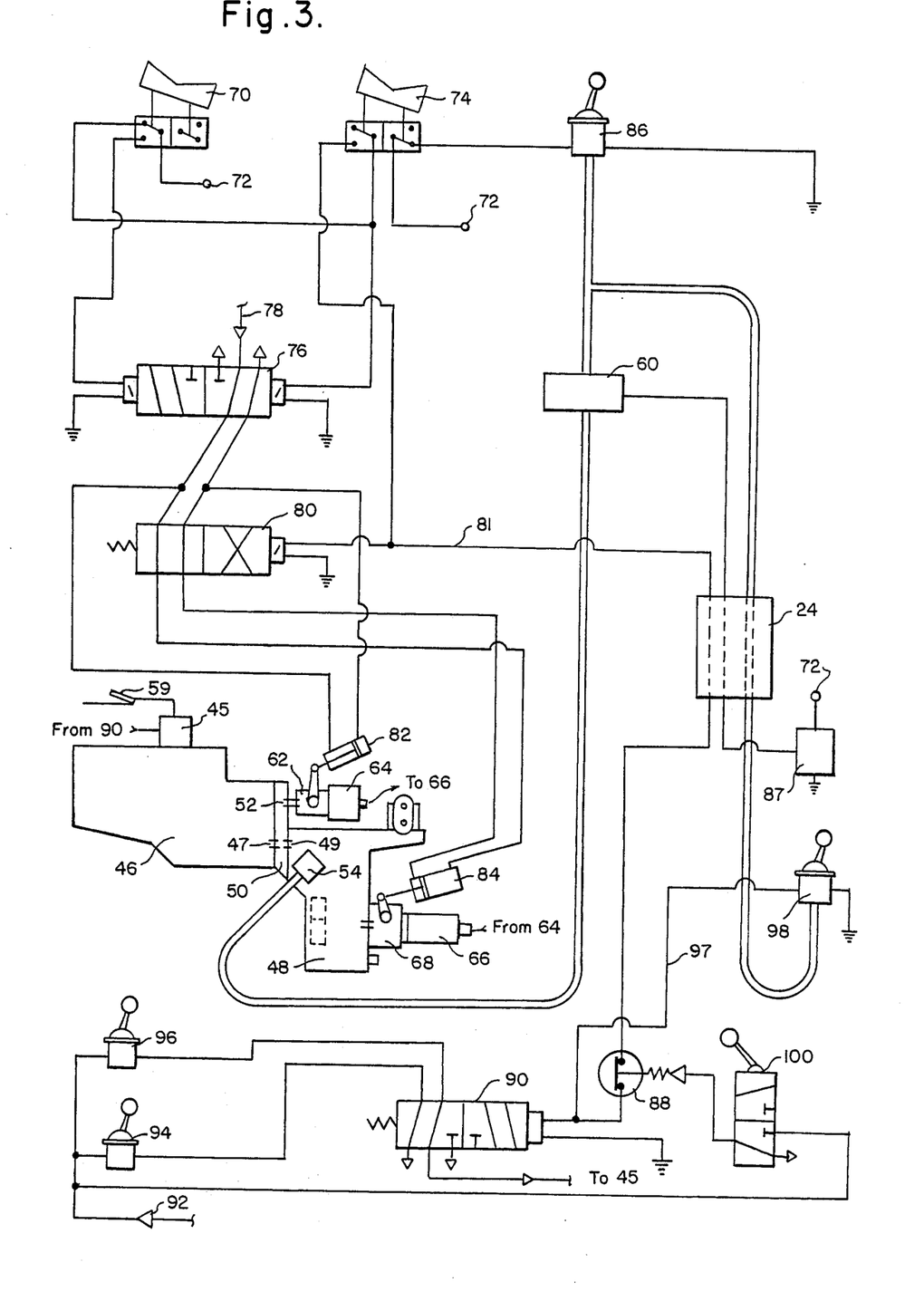
FIG. 3 is a schematic representation of the components of the apparatus in its remote operating mode.

In the remote operating mode of excavator 10, the travel/remote selector switch 70 is disposed in its second position and the railroad/remote selector switch 74 is disposed in its second position. Certain features of the remote operating mode of excavator 10 are disclosed in U.S. patent application Ser. No. 807,616, filed Dec. 11, 1985, the disclosure of which is incorporated herein by reference. When the travel/remote selector switch 70 is in its second position, first air solenoid valve 76 is caused to enter its second position thereby causing pneumatic pressure to be provided from source 78 to the opposite sides of first air cylinder 82. When railroad/remote selector switch 74 is in its second position, second air solenoid valve 80 is in its first position. The pneumatic pressure passing from second air solenoid valve 80 is provided to the barrel side of second air cylinder 84 to cause jaw clutch 68 to allow the coupling of hydraulic motor 66 with the secondary input 57 to transmission 48. In addition, the disposition of first air solenoid valve 76 in its first position provides pneumatic pressure from source 78 through air solenoid valve 76 to the rod side of first air cylinder 82 to cause the engagement of first jaw clutch 62 thereby causing the coupling of hydraulic pump 64 with the power take-off 52 from torque converter 50. Accordingly, when the excavator 10 is in the remote operating mode, the hydraulic pump 64 is coupled to the power take-off 52 in order to provide pressurized hydraulic fluid to hydraulic motor 66 which is, in turn, coupled to the secondary input 57 to transmission 48. When the railroad/remote selector switch 74 is in the second or remote position, the lower cab transmission selector 86 is coupled to the potential source 72 to provide control signals to control box 60. In addition, when in the remote mode, the transmission control box 60 receives a signal from travel/remote switch 70 effective to cause solenoids 54 to uncouple primary transmission input 49 from the transmission 48 and to allow the transmission 48 to accept rotational input from the secondary input 57 to transmission 48 provided by hydraulic motor 66 to generate a rotational output to power the movement of vehicle 10. Further, when in the remote operating mode, a first transmission selector 87 disposed in the upper cab 36 is energized by source 72 which is effective to control transmission control box 60 to select the gear ranges of transmission 48 by means of solenoids 54. The control of the throttle regulating means 45 of engine 46 when the excavator 10 is in its remote operating mode is discussed below.

Figure 4:
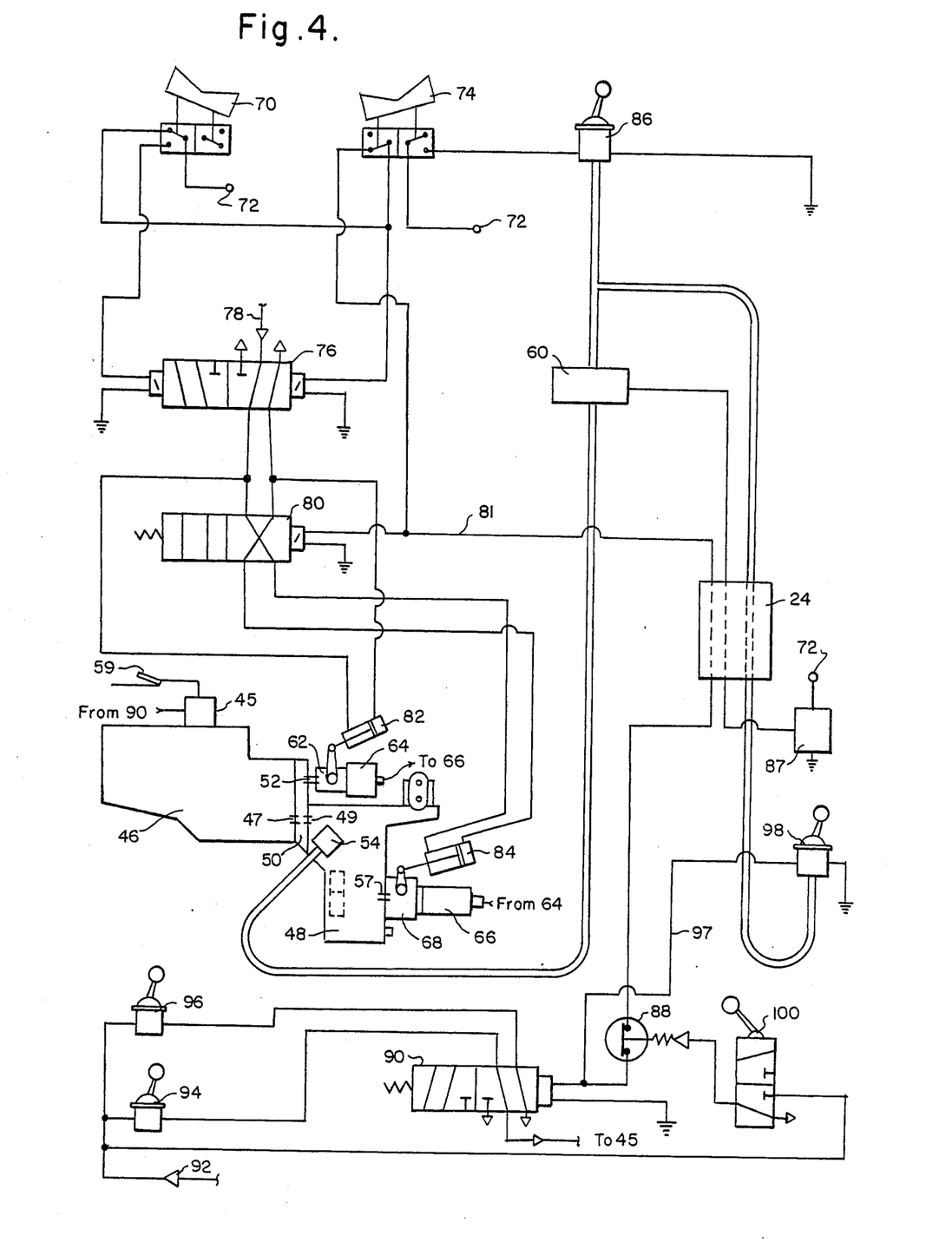
FIG. 4 is a schematic drawing of the apparatus in the railroad operating mode with throttle control being effectuated by the spring return throttle.

In the event the vehicle 10 is intended to be operated in the railroad operating mode, the travel/remote selector switch 70 is disposed in its second position and the railroad/remote selector switch 74 is disposed in its first position. Because the travel/remote selector switch 70 is in its second position, it causes the first air solenoid valve 76 to be in its second position. In this position, pneumatic pressure is provided from source 78 directly to the rod side of air cylinder 82 to cause first jaw clutch 62 to couple the hydraulic pump 64 with the power take-off 52. However, because the railroad/remote selector switch 74 is in its first position, it causes the second air solenoid valve 80 to be in its second position. In this position, second air solenoid valve 80 causes pneumatic pressure to be provided to the rod side of second air cylinder 84 to cause second jaw clutch 68 to disengage hydraulic motor 66 from the secondary input 57 to transmission 48. Accordingly, in the railroad operating mode the hydraulic pump 64 is coupled to the power take-off 52 but the hydraulic motor 66 is uncoupled from the secondary input 57 to transmission 48.

When the excavator 10 is in the railroad operating mode, the railroad/remote selector switch 74 also causes an electrical signal to be provided to a wire 81 passing through center pin 24. Wire 81 is operatively connected to an air actuatable pressure switch 88 located on the upper structure 20. Air pressure switch 88 is normally spring biased to a contact position. The electrical signal from air pressure switch 88 is coupled to an upper structure air solenoid valve 90. The pneumatic pressure from a source 92 is provided to a first upper structure throttle control 94 and a second upper structure throttle control 96. First upper structure throttle control 94 preferably comprises a spring return throttle which controls the supply of pneumatic pressure from source 92 to the upper structure air solenoid valve 90. However, in the event the first upper structure throttle control 94 is released, it will return to its neutral position thereby prohibiting air flow therethrough. The pneumatic pressure supplied through first upper structure throttle control 94 is provided through upper structure air solenoid valve 90, which is in its first position due to the closed condition of pressure switch 88, through the center pin 24 to control the throttle actuator 45 on the engine 46. The electrical signal provided through pressure switch 88 also provides an electrical signal by means of a control wire 97 to a secondary upper structure transmission controller 98. Transmission controller 98 is coupled through the center pin 24 to the transmission control box 60 which, in turn, controls the solenoids 54 of transmission 48 so as to select the gears desired. Accordingly, when in the railroad operating mode, if the spring return throttle 94 is operative, it may control the throttle 45 of engine 46 while the second transmission controller 98 controls the transmission 48 gear range.

Figure 5:
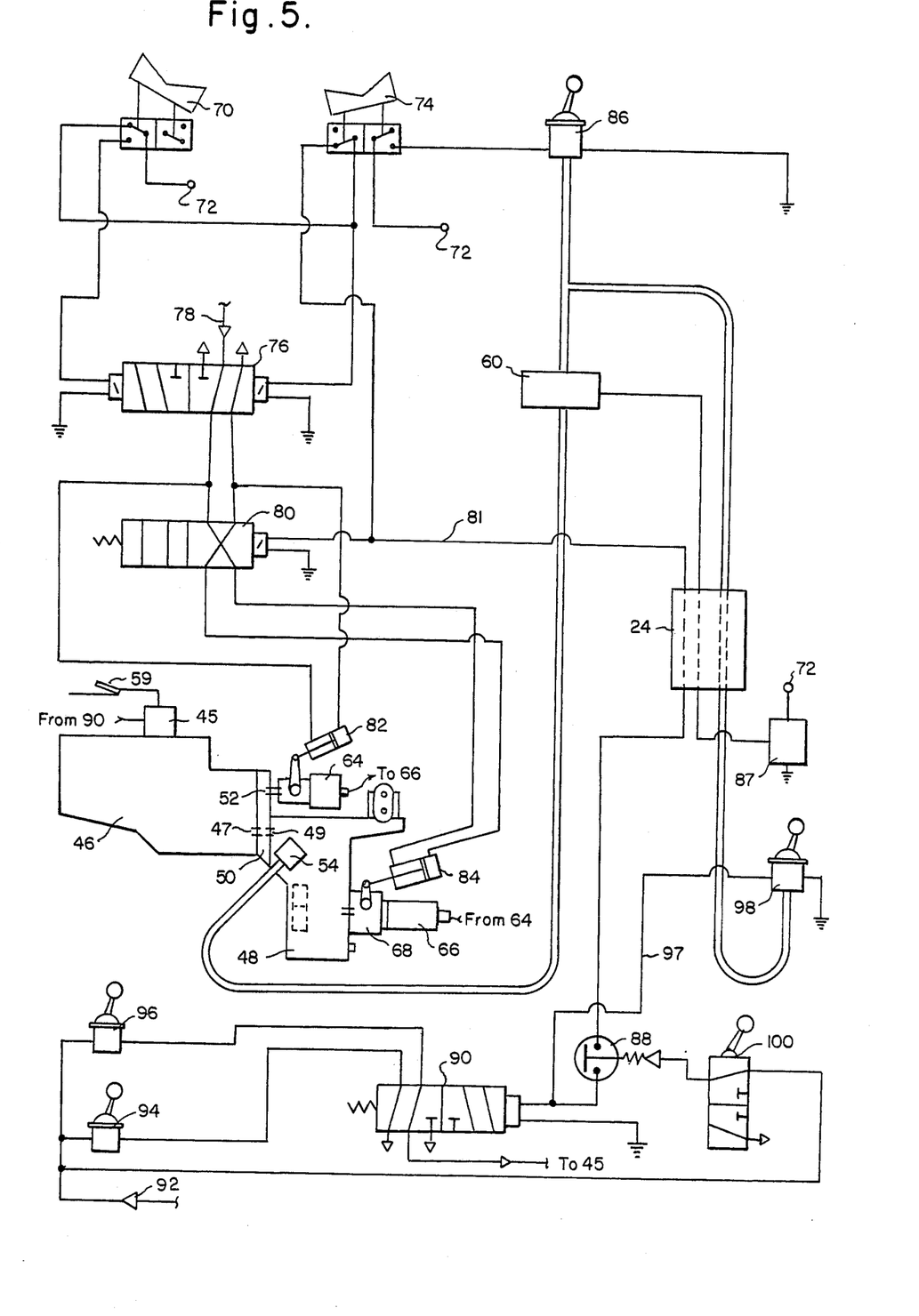
FIG. 5 is a schematic drawing of the apparatus components in the remote operating mode with the friction detented throttle being employed.

In accordance with the present invention, in the railroad operating mode an alternative throttle control mechanism is provided for engine 46. The pneumatic pressure from supply 92 is also supplied to a dig brake control switch 100 disposed in the upper structure operator's cab 36. The dig brake control switch 100 is effective to apply the pneumatic brakes of excavator 10 by means known to those skilled in the art. In addition, when the dig brake control switch 100 is actuated, it provides pneumatic pressure from source 92 to open the air pressure switch 88 to thereby prohibit actuation of the upper structure transmission controller 98. In addition, the fact that the air pressure switch 88 is prohibited from contact causes the air solenoid valve 90 to be operated by its spring bias. This action moves air solenoid valve 90 to a second position. Pneumatic pressure from supply 92 passes through second throttle controller 96 and is provided to upper structure air solenoid valve 90 to provide a pneumatic signal through the center pin 24 to control the throttle actuator 45 on the chassis engine 46.

Accordingly, in the railroad operating mode, a voltage is imposed on wire 81 to cause upper air solenoid valve 90 to move it to its first position to allow pneumatic pressure passing from throttle control 94 to control engine 46. If the dig brake 100 is applied, it provides pneumatic pressure to open the contacts of pressure switch 88 to move air solenoid 90 to its second position to thereby allow the use of throttle controller 96.

Alternatively, when the excavator 10 is in the remote operating mode, no voltage is imposed on wire 81 and, hence, upper air solenoid valve 90 is in its first position to cause first throttle controller 94 to be effective.

It will be understood that various changes in the details, materials and arrangements of parts which have been herein described and illustrated in order to explain the nature of the invention may be made by those skilled in the art within the principle and scope of the invention as expressed in the appended claims.

What is claimed is:
1. A material handling vehicle comprising:
  a. a lower truck chassis supported by a plurality of wheels, at least two of which are drive wheels, said lower truck chassis having a first operator's station;
  b. an upper structure mounted on said lower chassis and having a second operator's station;
  c. a manipulatable material handling implement mounted on said upper structure;
  d. an engine mounted on said lower chassis, said engine having a throttle control regulator which is controllable by a primary throttle control means in said first operator's station;
  e. a transmission means mounted on said lower chassis, said transmission means having a torque converter and also having drive gears coupled to said drive wheels, said torque converter having a first input means powered by said engine and a first output means which may be coupled to said drive gears and also having a second output means which may be powered by said first input means;
  f. a hydraulic power means;
  g. a first coupling means for coupling said hydraulic power means to said second output means and for uncoupling said hydraulic power means from said second output means;
  h. secondary throttle control means in said second operator's station for controlling said throttle control regulator; and
  i. first control means for alternatively (1) coupling said first output means of said torque converter to said drive gears while causing said first coupling means to uncouple said hydraulic power means from said second output means or (2) coupling said first output means to said drive gears while causing said first coupling means to couple said hydraulic power means to said second output means.

2. The material handling vehicle of claim 1 in which said first coupling means comprises:
  a. a first jaw clutch which, when engaged, couples said second output means to said hydraulic power means and which, when disengaged, uncouples said second output means from said hydraulic power means; and
  b. a first pneumatic cylinder controlled by said first control means, said first pneumatic cylinder being coupled to said first jaw clutch for engaging and disengaging said first jaw clutch.

3. The material handling vehicle of claim 2 in which said first control means comprises:
  a. a first pneumatic solenoid valve in fluid communication with said first pneumatic cylinder;
  b. a source of pneumatic pressure in fluid communication with said first solenoid valve; and
  c. a first control switch means coupled to said first pneumatic solenoid valve for causing said first pneumatic solenoid valve to provide pneumatic pressure to said first pneumatic cylinder to disengage said first jaw clutch when said first control switch means is in a first position and for causing said first pneumatic solenoid valve to provide pneumatic pressure to said first pneumatic cylinder to engage said first jaw clutch when said first control switch means is in a second position.

4. The material handling vehicle of claim 3 in which said transmission means comprises a powershift transmission having a second input means which may be coupled to said drive gears.

5. The material handling vehicle of claim 4 further comprising:
 a. a hydraulic drive means;
 b. second coupling means for coupling said hydraulic drive means to said second input means and for uncoupling said hydraulic drive means from said second input means; and
 c. said first control means further comprises means for alternatively (1) uncoupling said first output means from said drive gears while causing said first pneumatic cylinder to engage said first jaw clutch and while causing said second coupling means to couple said hydraulic drive means to said second input means of said transmission or (2) coupling said first output means to said drive gears while causing said second pneumatic cylinder to disengage said first jaw clutch and while causing said second coupling means to uncouple said hydraulic drive means from said second input means of said transmission.

6. The material handling vehicle of claim 5 in which said second coupling means comprises:
 a. a second jaw clutch which, when engaged, couples said hydraulic drive means to said second input means and which, when disengaged, uncouples said hydraulic drive means from said second input means; and
 b. a second pneumatic cylinder controlled by said first control means, said second pneumatic cylinder being coupled to said second jaw clutch for engaging and disengaging said second jaw clutch.

7. The material handling vehicle of claim 6 in which said first control means further comprises:
 a. a second pneumatic solenoid valve having a pneumatic input in fluid communication with said first pneumatic solenoid valve and an output in fluid communication with said second pneumatic cylinder; and
 b. a second control switch means coupled to said second pneumatic solenoid valve for causing said second pneumatic solenoid valve to provide pneumatic pressure to said second pneumatic cylinder to engage said second jaw clutch when said second control switch is in a first position and for causing said second pneumatic solenoid valve to provide pneumatic pressure to said second pneumatic cylinder to disengage said second jaw clutch when said second control switch is in a second position.

8. The material handling vehicle of claim 7 in which said secondary throttle control means comprises:
 a. a first pneumatic throttle control means in said second operator's station; and
 b. a second pneumatic throttle control means in said second operator's station.

9. The material handling vehicle of claim 8 further comprising:
 a. a second source of pneumatic pressure coupled to said first and said second throttle control means; and
 b. means for coupling said first or second throttle control means to said throttle control regulator.

10. The material handling vehicle of claim 9 in which said means for coupling said first or said second throttle control means to said throttle control regulator comprises:
 a. a third pneumatic solenoid valve which is displaceable between a first position in which said first throttle control means is coupled to said throttle control regulator and a second position in which said second throttle control means is coupled to said throttle control regulator; and
 b. means for moving said third pneumatic solenoid valve between its first and second positions.

11. The material handling vehicle of claim 10 in which said means for moving comprises:
 a. means for normally biasing said third solenoid valve to its second position;
 b. means for generating a potential in a first control wire when said second control switch is in its first position;
 c. a pressure switch connected to said first control wire, said pressure switch being normally biased to a closed condition, said control switch being effective to move said third solenoid valve to its first position when said pressure switch is in a closed condition; and
 d. means for opening the contact of said pressure switch.

12. The material handling vehicle of claim 11 in which said means for opening comprises a pneumatic control switch coupled to said second source of pneumatic pressure such that when said pneumatic control switch is in a first position pneumatic pressure is not supplied to said pressure switch and a second position in which pneumatic pressure is applied to said pressure switch to open said pressure switch.

13. The material handling vehicle of claim 12 further comprising:
 a. a secondary controlling means for said transmission located in said second operator's station; and
 b. a second control wire connected to said first control wire and to said secondary controlling means such that when said pressure switch is closed the potential in said second control wire causes said secondary controlling means to be effective to control said transmission and when said pressure switch is open the absence of a potential in said second control wire causes said secondary controlling means to be disabled from controlling said transmission.

14. The material handling vehicle of claim 13 further comprising railroad guide wheels movably attached to said lower chassis such that said guide wheels are movable between a retracted position and an extended position in which said guide wheels may support said vehicle on railroad tracks such that said drive wheels are in engagement with said railroad tracks.

15. The material handling vehicle of claim 14 in which said first throttle control means comprises a spring return throttle.

16. The material handling vehicle of claim 15 in which said second throttle control means comprises a friction detent throttle.

17. The material handling vehicle of claim 16 in which said hydraulic power means comprises a hydraulic pump.

18. The material handling vehicle of claim 17 in which said hydraulic drive means comprises a hydraulic motor.

* * * * *